(12) United States Patent
Sobey

(10) Patent No.: US 9,854,927 B1
(45) Date of Patent: Jan. 2, 2018

(54) OYSTER SHUCKING BOARD

(71) Applicant: Liam Sobey, Toronto (CA)

(72) Inventor: Liam Sobey, Toronto (CA)

( * ) Notice: Subject to any disclaimer, the term of this patent is extended or adjusted under 35 U.S.C. 154(b) by 0 days.

(21) Appl. No.: 15/408,289

(22) Filed: Jan. 17, 2017

(51) Int. Cl.
*A22C 29/04* (2006.01)
*A47G 21/06* (2006.01)
*A47J 47/00* (2006.01)

(52) U.S. Cl.
CPC .......... *A47G 21/063* (2013.01); *A47J 47/005* (2013.01)

(58) Field of Classification Search
CPC ... A47G 21/061; A47G 21/062; A47G 21/065
USPC ....................................... 452/1–6, 13, 16, 17
See application file for complete search history.

(56) References Cited

U.S. PATENT DOCUMENTS

| | | | | |
|---|---|---|---|---|
| 2,747,220 A | * | 5/1956 | Thompson ........... | A47G 21/062 452/16 |
| 3,583,026 A | * | 6/1971 | Peoni .................. | A47G 21/062 269/2 |
| 4,059,870 A | * | 11/1977 | Finkelman .......... | B23K 1/0056 452/17 |

* cited by examiner

*Primary Examiner* — Richard Price, Jr.
(74) *Attorney, Agent, or Firm* — Mu P.C.

(57) ABSTRACT

An oyster shucking board is a tool for use when shucking oysters. There is a slot on one end for storing the knife needed to open an oyster, so it will be handy and available when preparing to shuck oysters. A notch or raised edge added to the underside of one side helps to secure the board to a countertop, and a circular indentation on the topside contains the juice when the oyster is shucked. A dock in the center of the board provides a convenient and safe way to hold the oyster while the knife is inserted between the two halves of its shell to open it. The juice and shell fragments will be collected and discarded easily, without leaving a mess on the countertop. The oyster shucking board is able to be made from wood, plastic, ceramic, or stainless steel.

6 Claims, 4 Drawing Sheets

OYSTER SHUCKING BOARD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of shellfish cleaning devices and more specifically relates to an oyster shucking board that provides a safe and effective way to shuck oysters which securely holds the oyster in a docking station while working to open it, and prevents the juice and shell fragments from leaving a mess on the counter.

2. Description of the Related Art

Oysters are a hugely popular dish enjoyed by multitudes of consumers. Oyster-lovers usually eat oysters in restaurants and bars because they wish to avoid the labor involved opening the hard shells. It is easy to cook oysters, or they can be eaten raw, but it is extremely difficult and dangerous to open their shells. It takes a lot of effort to pry open the shells which are sharp, and fingers are often cut by the shells or the sharp tools used to open them. The risk of injury and making a mess is very high. Those who work in restaurants sometimes have to open hundreds of oysters, spending all day opening them. Restaurant employees and those who like to serve oysters at home need a tool to make it easier and less dangerous to open them.

Various attempts have been made to solve the above-mentioned problems such as those found in U.S. Pat. No. 7,674,159 to Tomislav F. Littledeer; U.S. Pat. No. 7,510,467 to Dale Wells Parker; and U.S. Publication No. 2007/0042695 to Chong et al. This art is representative of oyster shucking devices. None of the above inventions and patents, taken either singly or in combination, is seen to describe the invention as claimed.

Ideally, an oyster shucking device should provide a safe and effective way to open oysters and, yet would operate reliably and be manufactured at a modest expense. Thus, a need exists for a reliable oyster shucking board to avoid the above-mentioned problems.

BRIEF SUMMARY OF THE INVENTION

In view of the foregoing disadvantages inherent in the known oyster shucking art, the present invention provides a novel oyster shucking board. The general purpose of the present invention, which will be described subsequently in greater detail is to provide an oyster shucking board that provides a safe and effective way to shuck oysters which securely holds the oyster in a docking station while working to open it, and prevents the juice and shell fragments from leaving a mess on the counter.

An oyster shucking board is disclosed herein comprising a top surface including at least one oyster holding indentation adapted to hold an oyster while shucking, a bottom surface including at least one raised edge adapted to be placed firmly against a supporting surface edge to hold the oyster shucking board in a stable position while shucking oysters, and at least one side edge including at least one slot adapted to hold an oyster shucking tool, with the at least one side edge being connected between the top surface and the bottom surface.

The top surface includes at least one liquid catching portion which is formed having a semi-torus shape surrounding each respective oyster holding indentation. The liquid catching portion further has a wall member extending from and surrounding at least a portion of the semi-torus shape and adapted to more securely accumulate and retain liquid emanating from an oyster within each liquid catching portion while being shucked. The wall member is connected to the liquid catching portion at two opposite ends thereby encircling each oyster holding indentation.

The top surface further includes at least one oyster holding member attached thereon and located adjacent at least one indentation, which is adapted to hold an oyster in a stable position within the semi-spherical indentation while shucking. The oyster holding member is formed having a wedge-shape adapted to push and hold an oyster into each respective oyster holding indentation when an oyster is pressed against the at least one oyster holding member.

The oyster holding member further includes a handle portion adapted to allow a user to more securely hold the oyster holding member while shucking an oyster. The oyster shucking board is able to be made from wood, plastic, ceramic or stainless steel. There are at least two oyster holding indentations upon the top surface spaced from one another, with an oyster shucking tool stored within the slot for use as needed.

The present invention holds significant improvements and serves as an oyster shucking board. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, oyster shucking board constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to an oyster shucking device and more particularly to an oyster shucking board as used to improve the ability of a user to firmly hold an oyster in a docking station while working to open it, and containing any juice and shell fragments to keep counter tops clean and free of debris.

Generally speaking, an oyster shucking board is a tool for use when shucking oysters. There is a slot on one end for storing the knife needed to open an oyster, so it will be handy and available when preparing to shuck oysters. A notch or raised edge added to the underside of one side helps to secure the board to a counter, and a circular indentation on the topside contains the juice when the oyster is shucked. A dock in the center of the board provides a convenient and safe way to hold the oyster while the knife is inserted between the two halves of its shell to open it. The juice and shell fragments will be collected and discarded easily, without leaving a mess on the countertop. It is able to be made from wood or plastic.

Figure 1:
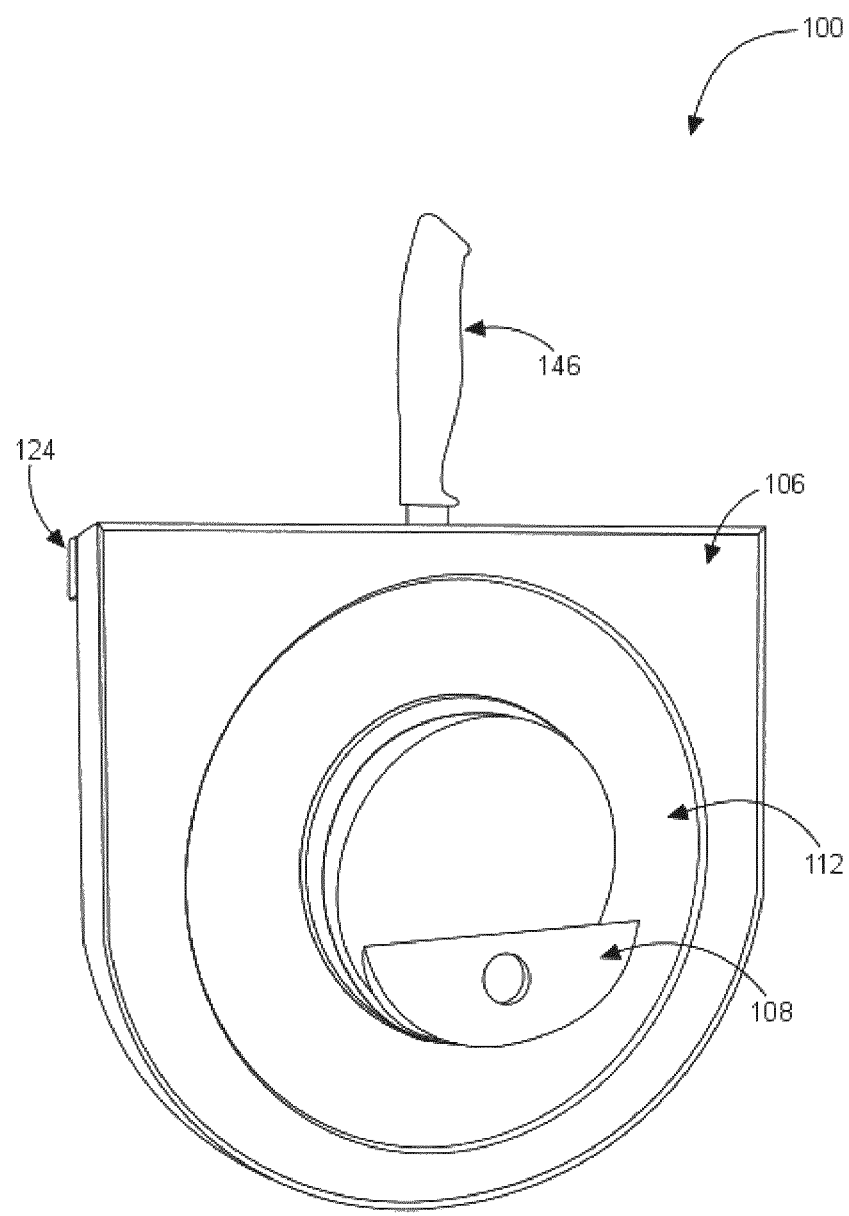
FIG. 1 shows a perspective view illustrating an oyster shucking board according to an embodiment of the present invention.

Referring to the drawings by numerals of reference there is shown in FIG. 1, a perspective view illustrating an oyster shucking board 100 according to an embodiment of the present invention.

Oyster shucking board 100 is disclosed herein comprising top surface 106 including at least one oyster holding indentation 108 adapted to hold an oyster while shucking, bottom surface 120 including at least one raised edge 124 adapted to be placed firmly against supporting surface edge 126 to hold oyster shucking board 100 in a stable position while shucking oysters, and at least one side edge 140 including at least one slot 144 adapted to hold oyster shucking tool 146, with the at least one side edge 140 being connected between top surface 106 and bottom surface 120.

Figure 2:
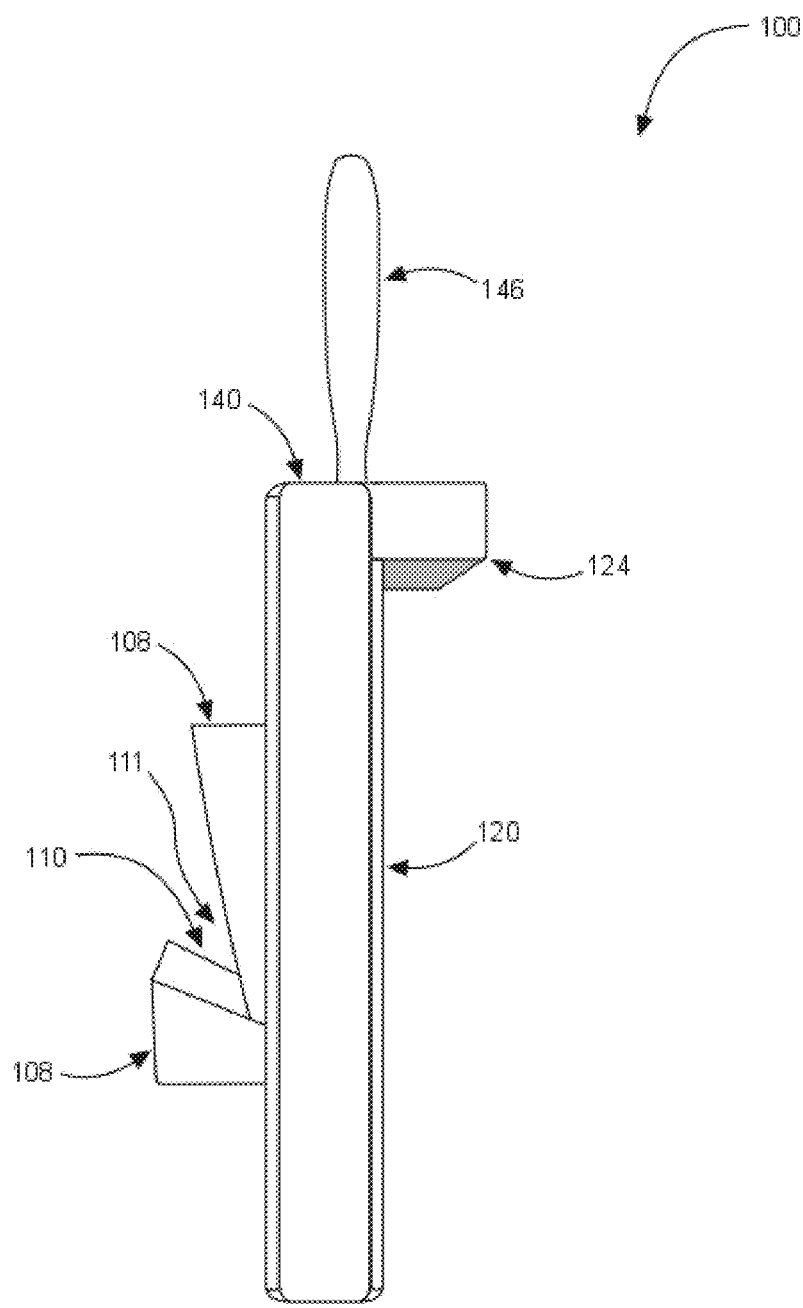
FIG. 2 is a side view illustrating an oyster shucking board according to an embodiment of the present invention of FIG. 1.

Referring now to FIG. 2, a side view illustrating an oyster shucking board 100 according to an embodiment of the present invention.

Top surface 106 includes at least one liquid catching portion 112 which is formed having a semi-torus shape surrounding each respective oyster holding member 108. Liquid catching portion 112 further has wall member 114 extending from and surrounding at least a portion of the semi-torus shape and adapted to more securely accumulate and retain liquid emanating from an oyster 116 within each liquid catching portion 112 while being shucked. Wall member 114 is connected to liquid catching portion 112 at two opposite ends thereby encircling each oyster holding member 108.

Figure 3:
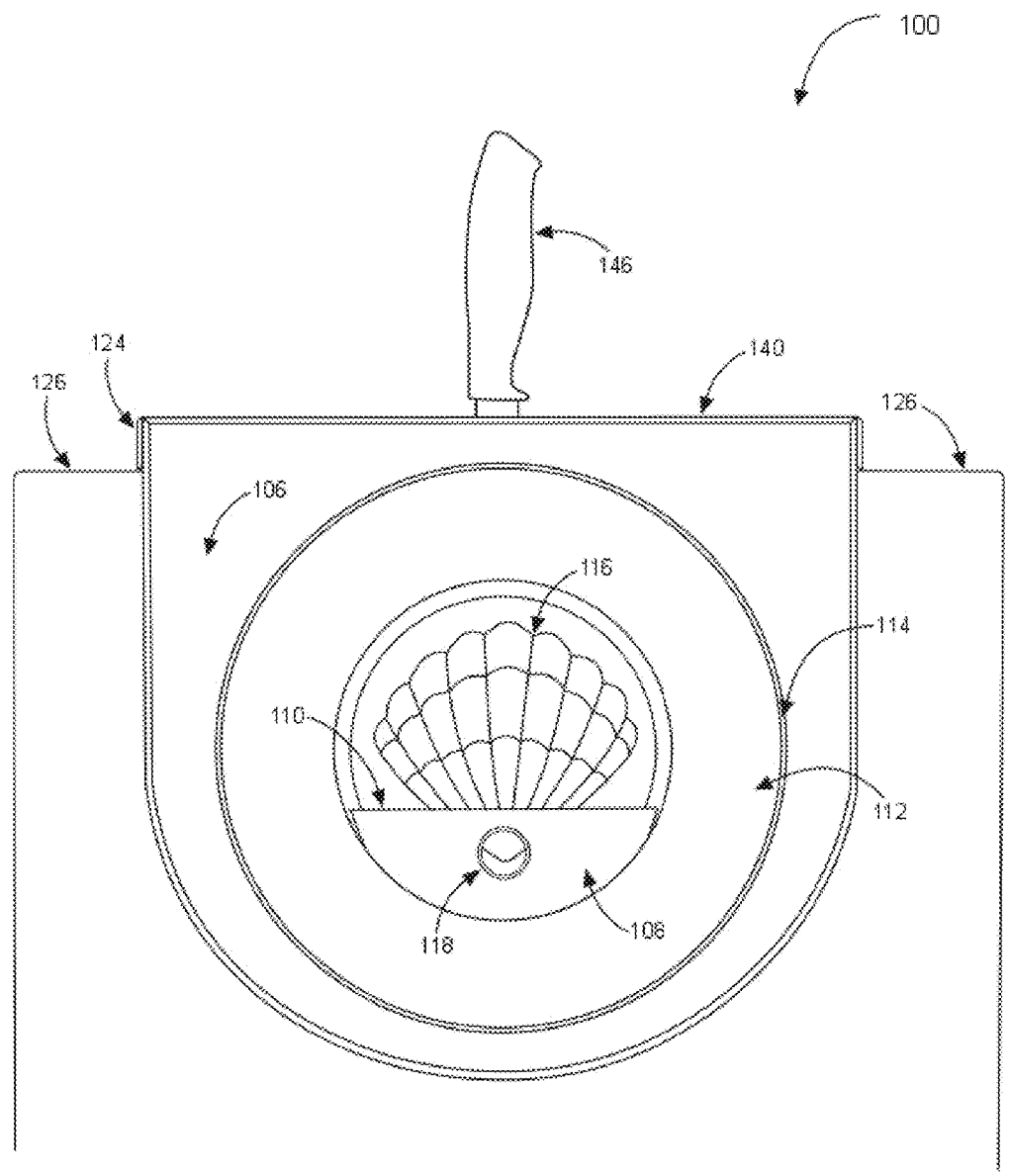
FIG. 3 is a top view illustrating an oyster shucking board in an in-use condition according to an embodiment of the present invention of FIG. 1.

Referring now to FIG. 3, is a top view illustrating an oyster shucking board 100 in an in-use condition 102 according to an embodiment of the present invention.

Top surface 106 includes at least one oyster holding member 108 including oyster holding indentation 110 which is adapted to hold an oyster in a stable position within oyster holding member 108 while shucking. Oyster holding member 108 is formed having wedge-shape 111 adapted to push and hold oyster 116 into each respective oyster holding indentation 110 when oyster 116 is pressed against oyster holding member 108.

Figure 4:
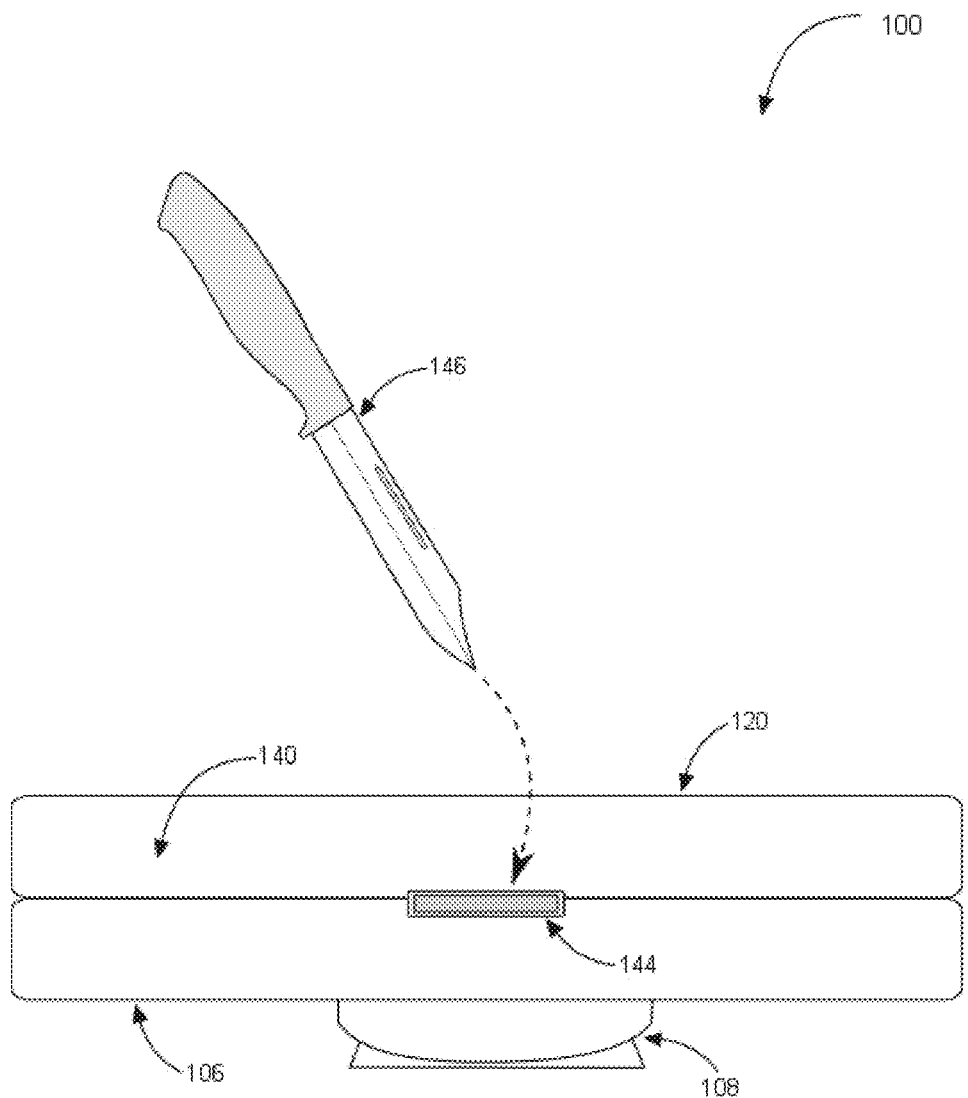
FIG. 4 is a side view illustrating oyster shucking board with slot to store oyster shucking tool according to an embodiment of the present invention of FIG. 1.

Referring now to FIG. 4, a side view illustrating oyster shucking board 100 with slot 144 to store oyster shucking tool 146 according to an embodiment of the present invention.

Oyster holding member 108 further includes handle portion 118 adapted to allow a user to more securely hold oyster holding member 108 while shucking oyster 116. Oyster shucking board 100 is able to be made from wood, plastic, ceramic or stainless steel. Oyster shucking tool 146 is stored within slot 144 for use as needed.

Oyster shucking board 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, or arrangements such as, for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An oyster shucking board comprising:
   a top surface including:
      at least one oyster holding member adapted to hold an oyster therein while shucking said oyster;
      at least one liquid catching portion formed adjacent to said at least one oyster holding member, wherein said at least one liquid catching portion is formed having a semi-torus shape surrounding each respective said at least one oyster holding indentation; and
      wherein the at least one liquid catching portion is configured to accumulate and hold liquid emanating from the oyster while being shucked;
   a bottom surface including:
      at least one raised edge adapted to be placed firmly against a supporting surface edge to thereby hold said oyster shucking board in a stable position while shucking oysters thereon;
   at least one side edge including:
      at least one slot therein adapted to removably hold an oyster shucking tool therein; and
      wherein said at least one side edge is connected between said top surface and said bottom surface.

2. The oyster shucking board of claim 1, wherein each said at least one liquid catching portion further includes a wall member extending from and surrounding at least a portion of said semi-torus shape and adapted to more securely retain said liquid emanating from an oyster within each said liquid catching portion while being shucked.

3. The oyster shucking board of claim 2, wherein each said wall member is connected to a respective said at least one liquid catching portion at two opposite ends thereof thereby encircling each said oyster holding indentation.

4. An oyster shucking board comprising:
   a top surface including:
      at least one oyster holding member adapted to hold an oyster therein while shucking said oyster, wherein each said at least one oyster holding member is formed having a wedge-shape, said wedge shape adapted to push and hold an oyster into at least one oyster holding indentation when said oyster is pressed against said at least one oyster holding member;
      at least one liquid catching portion formed adjacent to said at least one oyster holding member, wherein the at least one liquid catching portion is configured to accumulate and hold liquid emanating from the oyster while being shucked;
   a bottom surface including:
      at least one raised edge adapted to be placed firmly against a supporting surface edge to thereby hold said oyster shucking board in a stable position while shucking oysters thereon;
   at least one side edge including:
      at least one slot therein adapted to removably hold an oyster shucking tool therein; and
      wherein said at least one side edge is connected between said top surface and said bottom surface.

5. The oyster shucking board of claim 4, wherein each said at least one oyster holding member includes a handle portion adapted to allow a user to more securely hold said holding member while shucking an oyster.

6. An oyster shucking board comprising:
   a top surface including:
      at least one oyster holding member adapted to hold an oyster therein while shucking said oyster;
   a bottom surface including:
      at least one raised edge adapted to be placed firmly against a supporting surface edge to thereby hold said oyster shucking board in a stable position while shucking oysters thereon;
   at least one side edge including:
      at least one slot therein adapted to removably hold an oyster shucking tool therein, wherein said at least one side edge is connected between said top surface and said bottom surface; and
      an oyster shucking tool releasably stored within said at least one slot.

* * * * *